(No Model.)
E. SAMUEL.
CABLE RAILWAY.
No. 315,964. Patented Apr. 14, 1885.
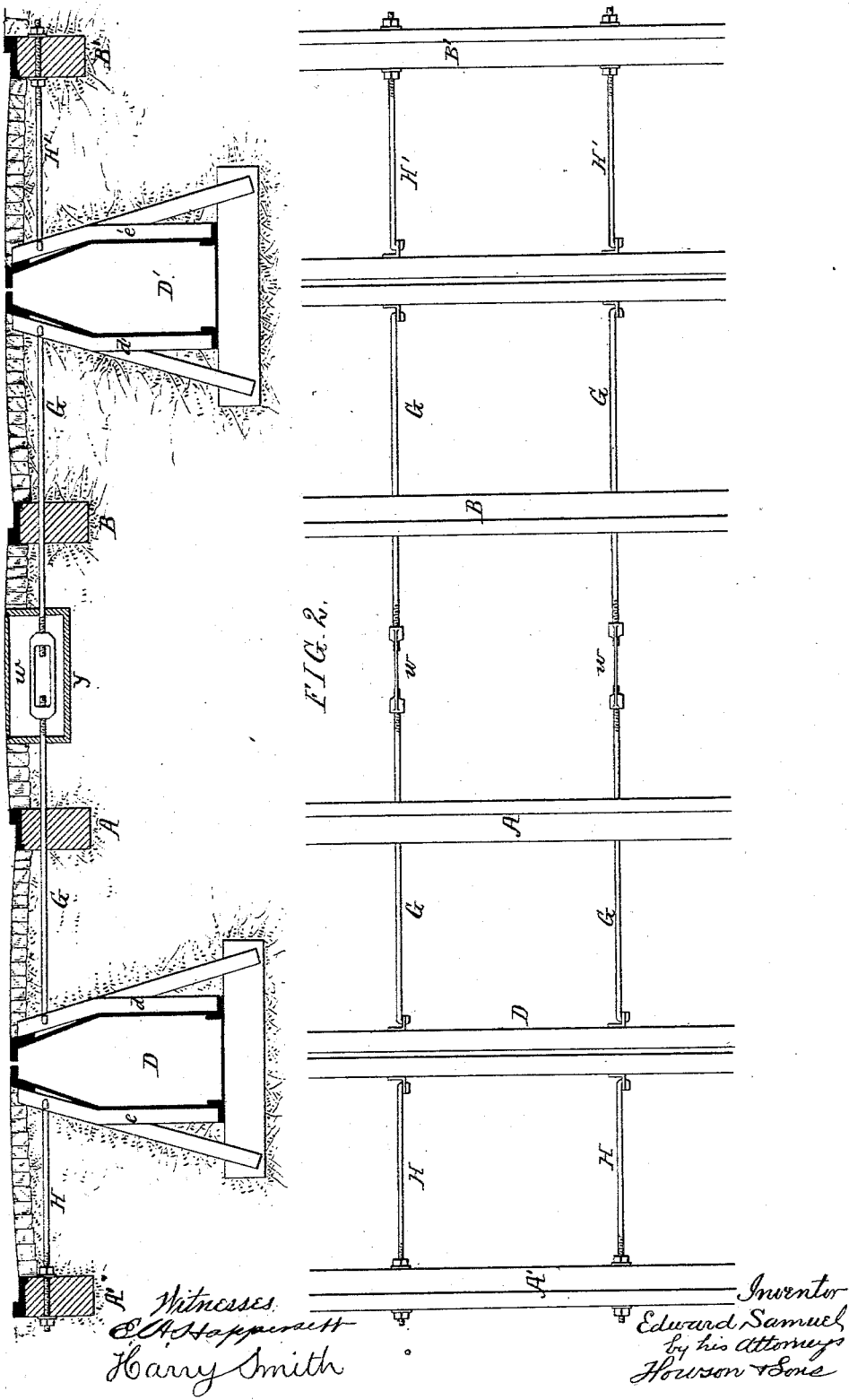

UNITED STATES PATENT OFFICE.

EDWARD SAMUEL, OF PHILADELPHIA, PA., ASSIGNOR TO WILLIAM WHARTON, JR., & CO., (LIMITED,) OF SAME PLACE.

CABLE RAILWAY.

SPECIFICATION forming part of Letters Patent No. 315,964, dated April 14, 1885.

Application filed February 3, 1885. (No model.)

*To all whom it may concern:*

Be it known that I, EDWARD SAMUEL, a citizen of the United States, and a resident of Philadelphia, Pennsylvania, have invented certain Improvements in Cable Railways, of which the following is a specification.

My invention relates to a double-track cable road; and it consists in connecting the inner sides of the two conduits together by adjustable stay-rods which are independent of the sills, the invention being fully described and claimed and its purport explained hereinafter.

In the accompanying drawings, Figure 1 is a vertical section of a double-track cable road, showing my improvement; and Fig. 2, a plan view.

A and A' are the two longitudinal sills of one track, and B and B' the sills of an adjoining track, of a double-track cable road, D D' being the two slotted cable-conduits, one situated midway between the sills of each track. The inner sides, d, of the two conduits are connected together by a series of adjustable tie-rods, G, which pass freely through the inner sills, A and B. The conduits are in the present instance constructed after the manner described in the patent of A. Bonzano, No. 287,220, dated October 23, 1883.

It has been found that during a frost there is such an expansion of the soil that the slots of the conduits become contracted; but this is prevented by the tie-rods G, which pass freely through the sills, and, if desired, these rods can be made adjustable in length. These rods G are independent of the sills A and B, and it is this feature which distinguishes my invention from that of William Wharton, Jr., described in an application marked "A," and bearing even date herewith, for in said application the sills A and B are described as being connected together and to the conduit. The side e of the conduit D is connected to the sill A' of one track by a series of rods, H, and the side e' of the conduit D' is connected by a series of similar rods, H', to the sill B' of the other track, all these rods being preferably adjustable. It is not necessary, however, that the outer side of each conduit should be connected to a sill, for the rods H may be anchored to the roadway, as described in an application (marked "C") for a patent made by myself and William Wharton, Jr., and bearing even date herewith.

There are different appliances by which the rods G may be made adjustable, if adjustability is desired; but I prefer the right and left hand screw-coupling w, which may be contained in a box, y, let into the roadway, and provided with a removable or hinged cover, so that ready access may be had to the coupling.

I claim as my invention—

1. The combination of the two conduits of a double-track cable road with adjustable tie-rods connecting the inner sides of the said conduits together, substantially as specified.

2. The combination of the two conduits of a double-track cable road with adjustable tie-rods connecting the inner sides of the conduits, and the box y, containing the adjusting device and having a movable cover, as specified.

In testimony whereof I have signed my name to this specification in the presence of two subscribing witnesses.

EDWD. SAMUEL.

Witnesses:
 HENRY HOWSON, Jr.,
 HARRY SMITH.